(12) United States Patent
Kuo

(10) Patent No.: US 7,924,559 B2
(45) Date of Patent: Apr. 12, 2011

(54) DOCKING STATION FOR PORTABLE COMPUTER

(75) Inventor: Sun-Yuan Kuo, Taipei (TW)

(73) Assignee: Compal Electronics, Inc., Taipei (TW)

( * ) Notice: Subject to any disclaimer, the term of this patent is extended or adjusted under 35 U.S.C. 154(b) by 224 days.

(21) Appl. No.: 12/403,336

(22) Filed: Mar. 12, 2009

(65) Prior Publication Data

US 2010/0091446 A1 Apr. 15, 2010

(30) Foreign Application Priority Data

Oct. 9, 2008 (TW) .............................. 97138965 A

(51) Int. Cl.
- G06F 1/16 (2006.01)
- H05K 5/00 (2006.01)
- H05K 7/00 (2006.01)

(52) U.S. Cl. ................................. 361/679.41
(58) Field of Classification Search ....... 361/679.41–44, 361/679.55, 679.58; 439/374; 710/303
See application file for complete search history.

(56) References Cited

U.S. PATENT DOCUMENTS

| | | | | |
|---|---|---|---|---|
| 6,115,245 A * | 9/2000 | Ruch et al. | ............... | 361/679.58 |
| 6,912,125 B2 * | 6/2005 | Weng | .................. | 361/679.41 |
| 7,110,252 B2 * | 9/2006 | Liang et al. | ............. | 361/679.57 |
| 7,283,357 B2 * | 10/2007 | Kim | .......................... | 361/679.41 |
| 7,286,344 B2 * | 10/2007 | Kim | .......................... | 361/679.41 |
| 7,505,265 B2 * | 3/2009 | Nishiyama | ............... | 361/679.41 |
| 2003/0231465 A1 * | 12/2003 | Weng | ........................... | 361/686 |
| 2005/0128687 A1 * | 6/2005 | Liang et al. | ................... | 361/679 |
| 2007/0177347 A1 * | 8/2007 | Nishiyama | ................... | 361/686 |
| 2008/0003860 A1 * | 1/2008 | Carnevali | ...................... | 439/296 |
| 2008/0270664 A1 * | 10/2008 | Carnevali | ...................... | 710/303 |

* cited by examiner

*Primary Examiner* — Jayprakash N Gandhi
*Assistant Examiner* — Adrian S Wilson
(74) *Attorney, Agent, or Firm* — Jianq Chyun IP Office

(57) ABSTRACT

A docking station including a housing, a sliding block, a pulling element, a first elastic element, a raising cover, a plurality of first and second hooks, and a linkage is provided. The housing has a first, a second and a third constraining structures, and the sliding block is disposed in the first constraining structure. The pulling element is pivoted on the housing, wherein a pulling portion thereof is exposed out of the housing and a pushing portion thereof contacts the sliding block. The first elastic element is connected between the housing and the sliding block. The first hooks are disposed on the raising cover and driven by the sliding block. The linkage is disposed in the second constraining structure of the housing, wherein a first end thereof is connected to the sliding block. The second hooks are driven by a second end of the linkage.

28 Claims, 9 Drawing Sheets

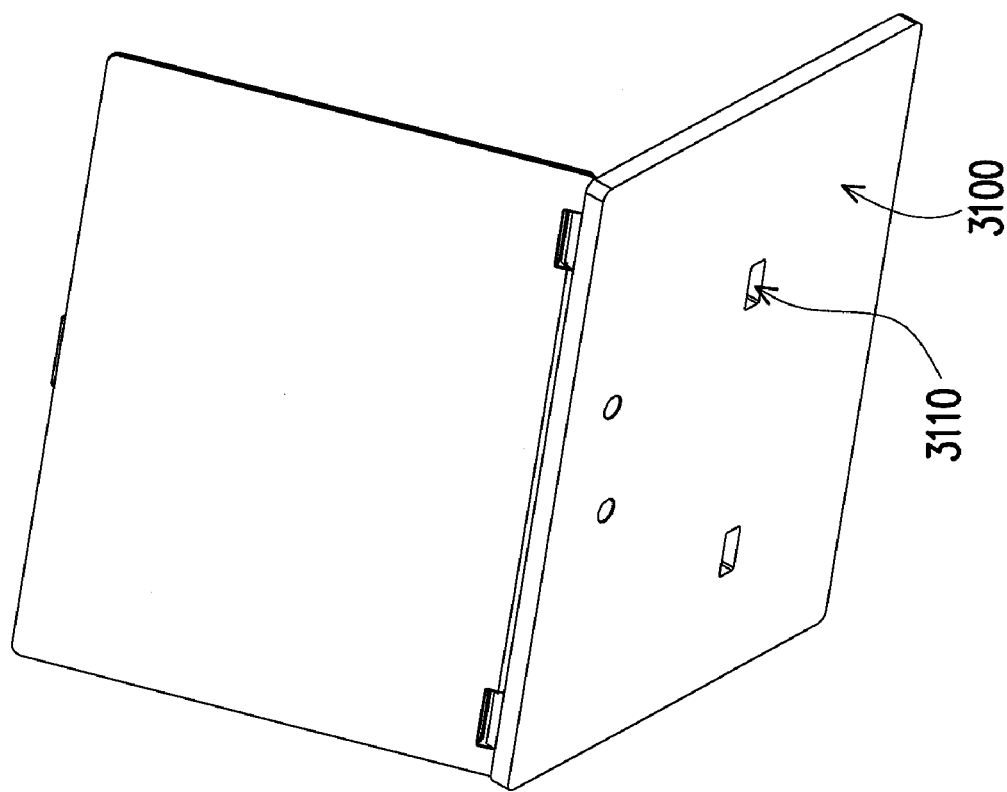

DOCKING STATION FOR PORTABLE COMPUTER

CROSS-REFERENCE TO RELATED APPLICATION

This application claims the priority benefit of Taiwan application serial no. 97138965, filed on Oct. 9, 2008. The entirety of the above-mentioned patent application is hereby incorporated by reference herein and made a part of specification.

BACKGROUND OF THE INVENTION

1. Field of the Invention

The present invention relates to a docking station, and more particularly, to a docking station for a portable computer installed thereon being smoothly detached therefrom.

2. Description of Related Art

The most significant difference of a portable computer from a desktop computer rests in that the portable computer pursues light-slim-short-small figures so that the user thereof can easily carry the portable computer and the user is allowed to manipulate the computer under various environments. On the other hand, restricted by the light-slim-short-small design requirements, in terms of functions and expansion possibility, the portable computer can not be mentioned in the same breath with a desktop computer having the overwhelming advantage of a larger operational space.

Accordingly, a docking station was developed in the prior art, wherein the docking station has a connector, so that a user can connect computer peripheral equipments such as mouse, printer, external hard disk, network interface card (NIC), scanner or others to the docking station in long term way, and whenever the user needs the peripheral equipments, the user just connects the portable computer to the docking station so as to link the computer with the peripheral equipments. In this way, a user not only enjoys the light and handy feature of a portable computer, but also is exempted from the troubles of putting in for connection and putting out for disconnection between the portable computer and the peripheral equipments by means of the docking station; meanwhile, the user has the same benefits in terms of functions and expansion possibility as a desktop computer.

In a conventional docking station, the portable computer and the docking station are fixed together by means of a plurality of hooks disposed on the docking station to lock the corresponding locking slots of the computer. Whenever a user want to detach the portable computer from the docking station, the user would exert a force transmitted to the hooks via transmission components so as to disengage the hooks from the locking slots of the computer, and then, another force exerted by the user is transmitted to other extracting components via the transmission components so as to extract the portable computer.

FIG. 1A is a top-view diagram of a conventional docking station and FIGS. 1B and 1C are diagrams of the docking station of FIG. 1A in different viewing angles. Referring to FIGS. 1A, 1B and 1C, in order to detach a portable computer (not shown) from a docking station 1, a user needs to pull the pulling portion 102 of a knob 10, so that a push-end 101a pushes a push-linkage 35 to move on a supporting component 34 along the axial direction of the push-linkage 35. At the time, a secondary push-linkage 355 pivoted on a pivot 354 drives a sliding block 357 to move, and a slanted surface of the sliding block 357 enables a lifting component 20 for upwards moving.

Meanwhile, another secondary push-linkage 356 pivoted on the pivot (not indicated) drives another sliding block 358, the slanted surface of the sliding block 358 pushes the slanted surface 410 of the swinging arm 41 of a swinging device 40, so that the swinging arm 41 swings upwards and thereby the two hook bodies 42 disposed on the both ends of a rotation shaft 153 unhook from the locking slots of the portable computer. Finally, the portable computer is upwards extracted by means of the upwards moving of the lifting component 20.

In the conventional docking station 1, to unhook the hook bodies 42 from the locking slots of the portable computer and to upwards extract the portable computer by using the lifting component 20, a plurality of components are needed for driving. During transmitting forces, the exerted forces may be reduced due to the friction between the components and the alteration of the transmission directions, which makes the unhooking effect of the hook bodies 42 and the extracting effect of the lifting component 20 fail to achieve the expected levels. In this regard, how to enhance the unhooking effect and the extracting effect so as to smoothly detach the portable computer from the docking station 1 is an important issue to be solved currently.

SUMMARY OF THE INVENTION

Accordingly, the present invention is directed to a docking station making a portable computer smoothly detached therefrom.

In light of the above described, the present invention provides a docking station suitable to be connected to a portable computer. The docking station includes a housing, a sliding block, a pulling element, a first elastic element, a raising cover, a plurality of first hooks, a linkage and a plurality of second hooks. The housing has a first constraining structure, a second constraining structure and a third constraining structure, and the sliding block is disposed in the first constraining structure. The pulling element is disposed on the housing and has a pulling portion and a pushing portion, wherein the pulling portion is exposed out of the housing and the pushing portion contacts to the sliding block. The first elastic element is connected between the housing and the sliding block. The first hooks are disposed on a raising cover and driven by the sliding block, wherein the raising cover is disposed at the housing. The linkage is disposed in the third constraining structure of the housing and has a first end and a second end, wherein the first end is connected to and driven by the sliding block. The second hooks are disposed in the housing and driven by the second end of the linkage, wherein when pulling the pulling portion of the pulling element, the pushing portion pushes the sliding block to move in the first constraining structure towards a first direction, the first hooks and the linkage are driven by the sliding block so as to both move towards a second direction and the linkage drives the second hooks move towards the second direction. The first direction and the second direction are perpendicular to each other.

In an embodiment of the present invention, a material of the above-mentioned housing is metal.

In an embodiment of the present invention, the above-mentioned first constraining structure includes groove, raised rib, raised post or a combination thereof.

In an embodiment of the present invention, the above-mentioned sliding block includes a first driven structure, and the second constraining structure is intervened with the first driven structure to restrict the moving of the sliding block.

In an embodiment of the present invention, the above-mentioned first driven structure is an opening or a groove and the second constraining structure is a raised post or a raised rib.

In an embodiment of the present invention, the above-mentioned docking station further includes a constraining element, wherein the constraining element has a constraining portion and a connecting portion, the connecting portion is sheathed by and disposed in the second constraining structure. The diameter of the constraining portion is greater than the diameter of the first driven structure in the second direction so as to restrict the moving of the sliding block in a third direction, wherein the third direction, the first direction and the second direction are perpendicular to each other.

In an embodiment of the present invention, the above-mentioned constraining element is a screw.

In an embodiment of the present invention, the above-mentioned first driven structure is a raised post and the first constraining structure is a groove.

In an embodiment of the present invention, the above-mentioned sliding block has a first driving structure, the linkage has a second driven structure and the first driving structure is intervened with the second driven structure so as to make the linkage driven by the sliding block.

In an embodiment of the present invention, the above-mentioned first driving structure is an opening and the second driven structure is a raised post.

In an embodiment of the present invention, the above-mentioned first driving structure is a raised post and the second driven structure is a groove.

In an embodiment of the present invention, the above-mentioned sliding block has a second driving structure and the first hooks are suitable to be driven by the second driving structure to move towards the second direction.

In an embodiment of the present invention, the above-mentioned second driving structure is a groove with a slanted surface.

In an embodiment of the present invention, a material of the above-mentioned sliding block is plastic.

In an embodiment of the present invention, a material of the above-mentioned pulling element is metal.

In an embodiment of the present invention, the above-mentioned raising cover covers a part of the sliding block and a part of the first hooks goes through out of the raising cover.

In an embodiment of the present invention, the above-mentioned sliding block further has a third driving structure disposed correspondingly to the raising cover, wherein the raising cover is suitable to be driven by the third driving structure so as to move towards a third direction, and the third direction, the first direction and the second direction are perpendicular to each other.

In an embodiment of the present invention, the above-mentioned third driving structure is a slanted surface.

In an embodiment of the present invention, a material of the above-mentioned raising cover is plastic or acrylic.

In an embodiment of the present invention, the above-mentioned docking station further includes a plurality of second elastic components and the second elastic components are connected between the corresponding first hooks and the raising cover.

In an embodiment of the present invention, the above-mentioned second elastic elements are springs.

In an embodiment of the present invention, a material of the above-mentioned first hooks is plastic.

In an embodiment of the present invention, a material of the above-mentioned linkage is metal.

In an embodiment of the present invention, a material of the above-mentioned second hooks is plastic.

In an embodiment of the present invention, the above-mentioned docking station further includes a plurality of third elastic elements and the third elastic elements are disposed between the housing and the corresponding second hooks.

In an embodiment of the present invention, the above-mentioned third elastic elements are springs.

In an embodiment of the present invention, the above-mentioned docking station further includes a constraining cover disposed at the second end of the linkage and a part of each of the second hooks goes through out of the constraining cover.

In an embodiment of the present invention, a material of the above-mentioned constraining cover is metal.

In the docking station of the present invention, the first hooks and the second hooks can be smoothly and properly driven to interact with other components through disposing the sliding block and the linkage, so that the first hooks and the second hooks can be smoothly unlocked from the portable computer. By means of the docking station provided by the present invention, a user is able to easily detach the portable computer from the docking station.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a diagram of a portable computer suitable to be connected to the docking station of FIGS. 2A and 2B.

DESCRIPTION OF THE EMBODIMENTS

Figure 1A:
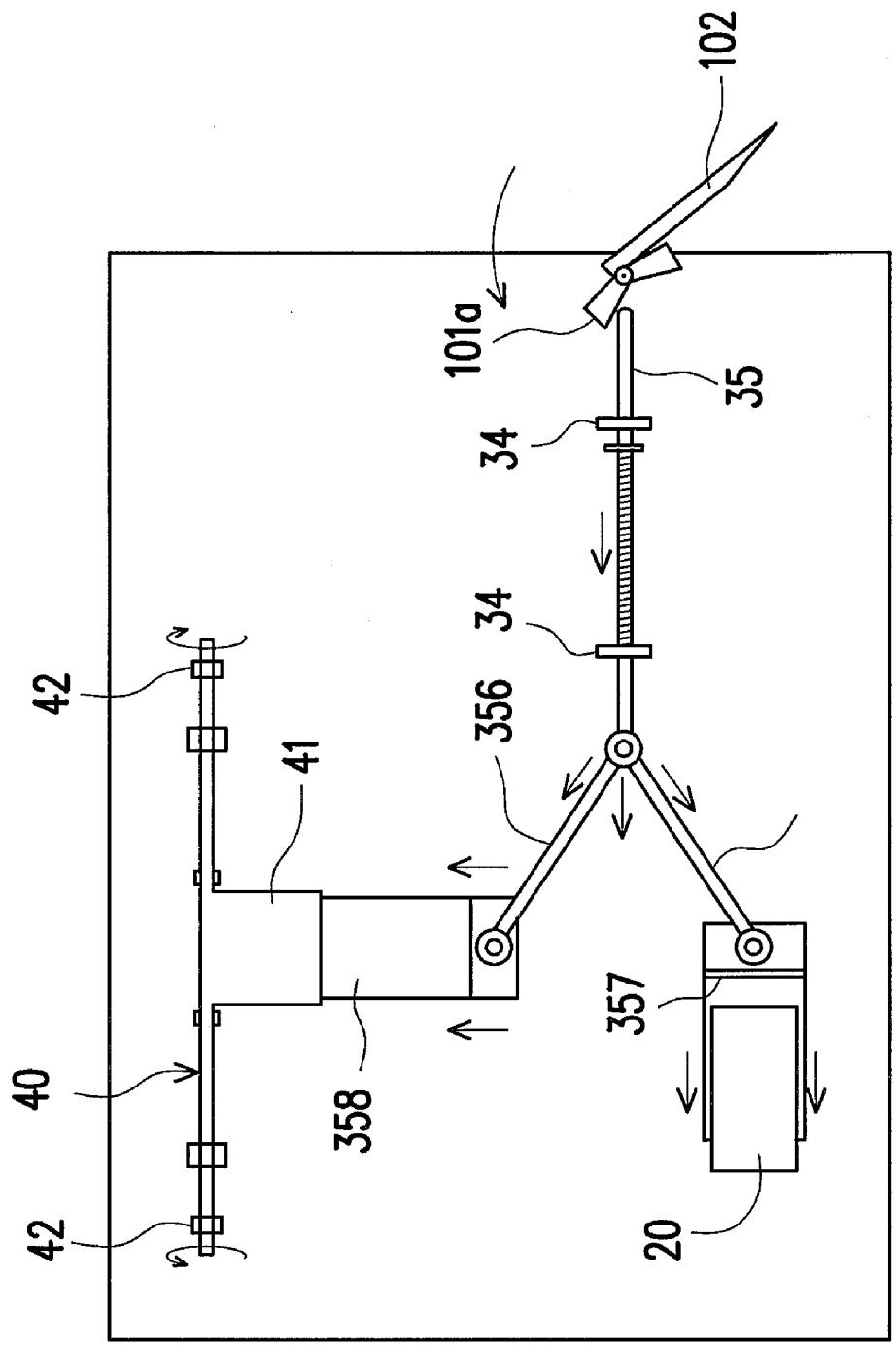
FIG. 1A is a top-view diagram of a conventional docking station.
Figure 1B:
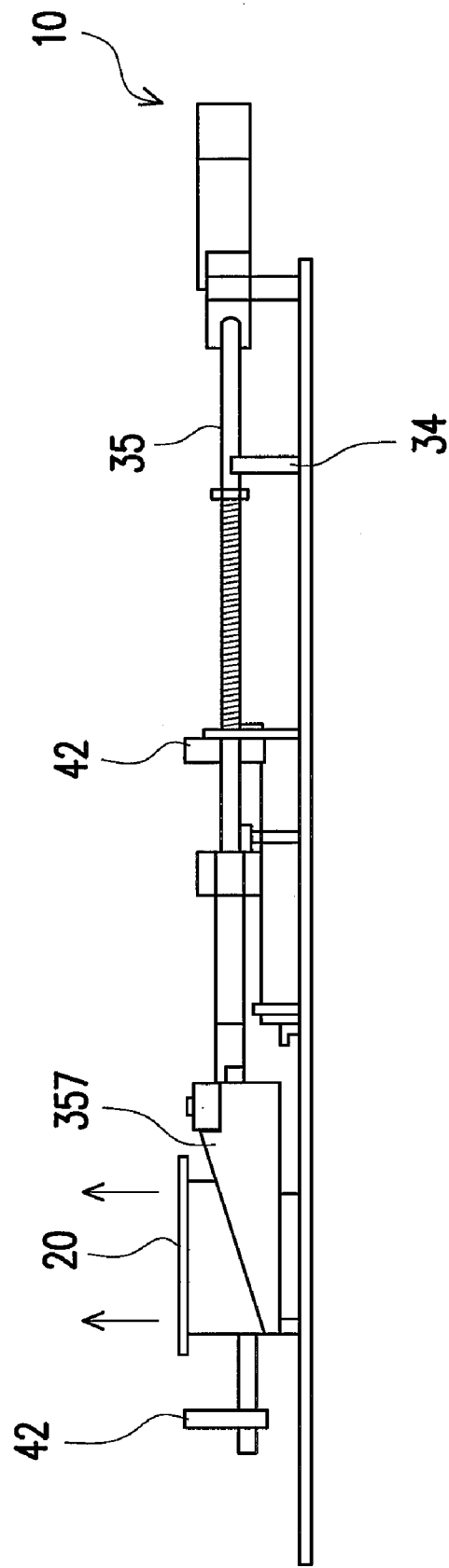
FIGS. 1B and 1C are diagrams of the docking station of FIG. 1A in different viewing angles.
Figure 1C:
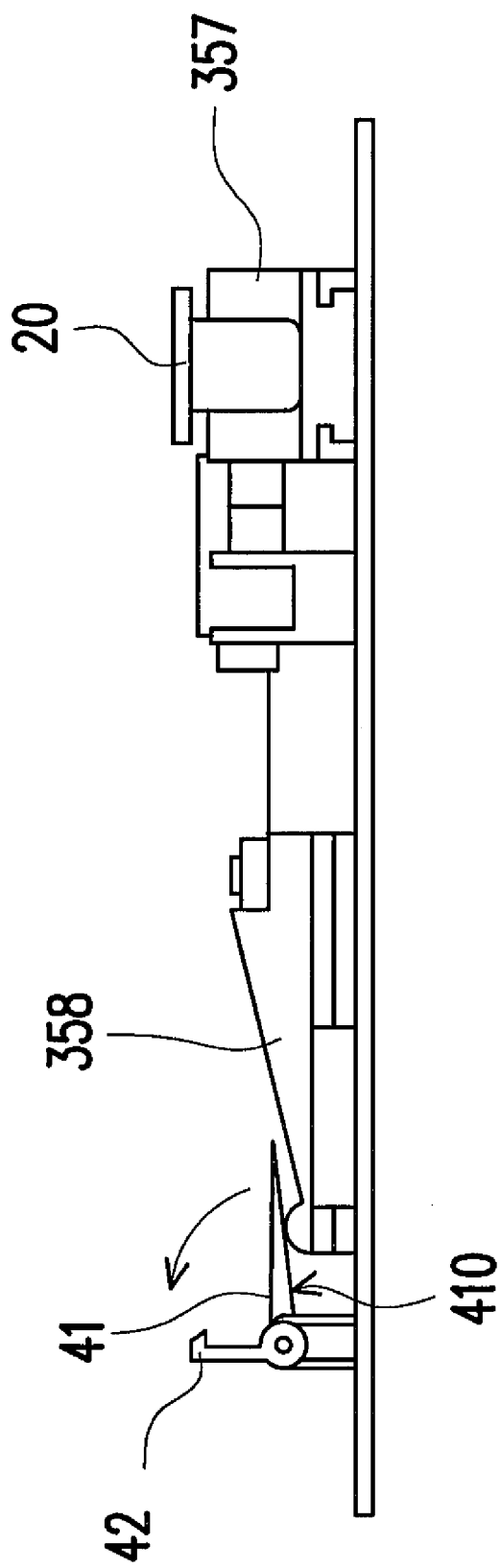

Reference will now be made in detail to the present preferred embodiments of the invention, examples of which are illustrated in the accompanying drawings. Wherever possible, the same reference numbers are used in the drawings and the description to refer to the same or like parts.

Figure 2A:
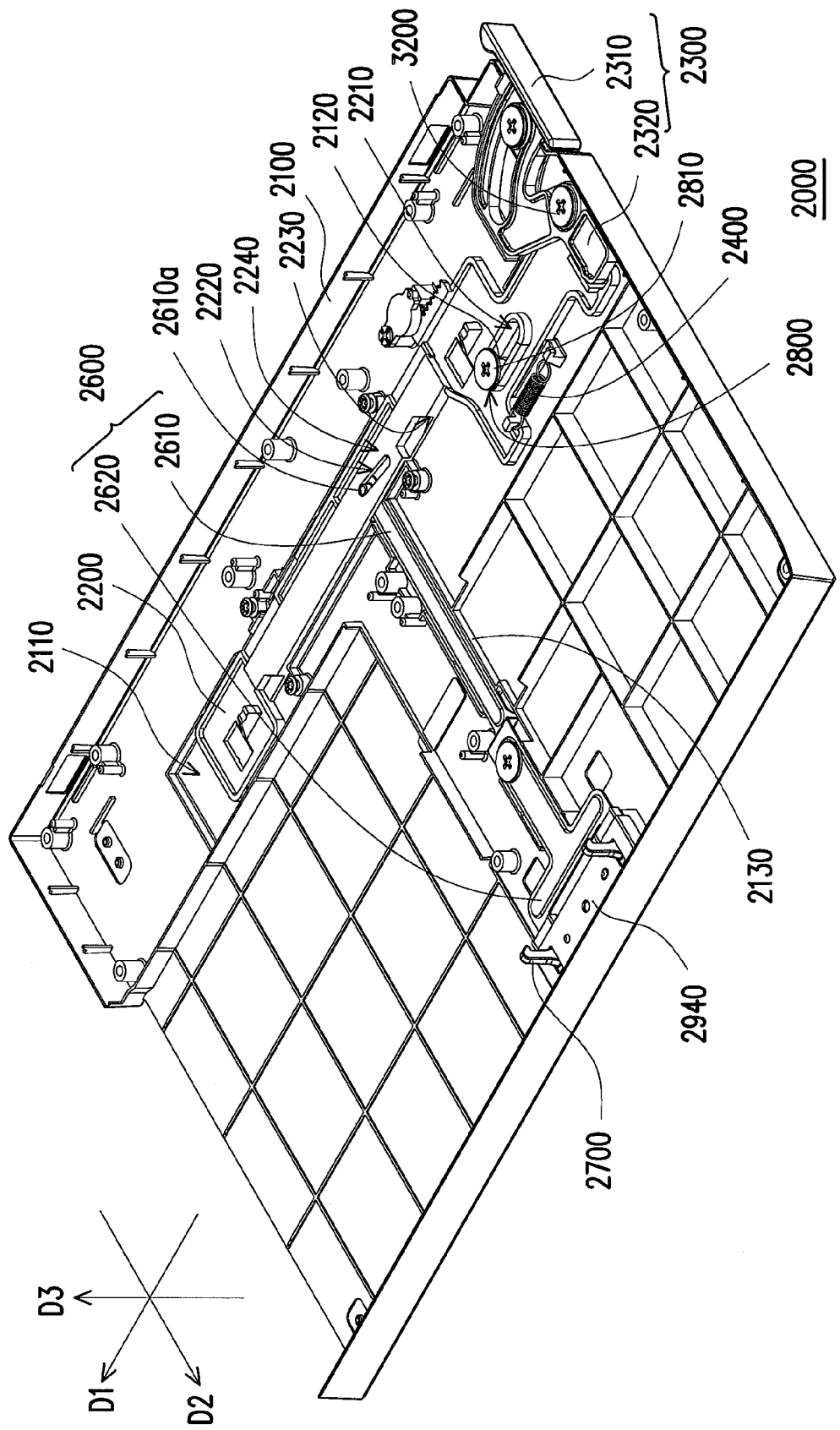
FIG. 2A is a diagram of a docking station according to an embodiment of the present invention.
Figure 2B:
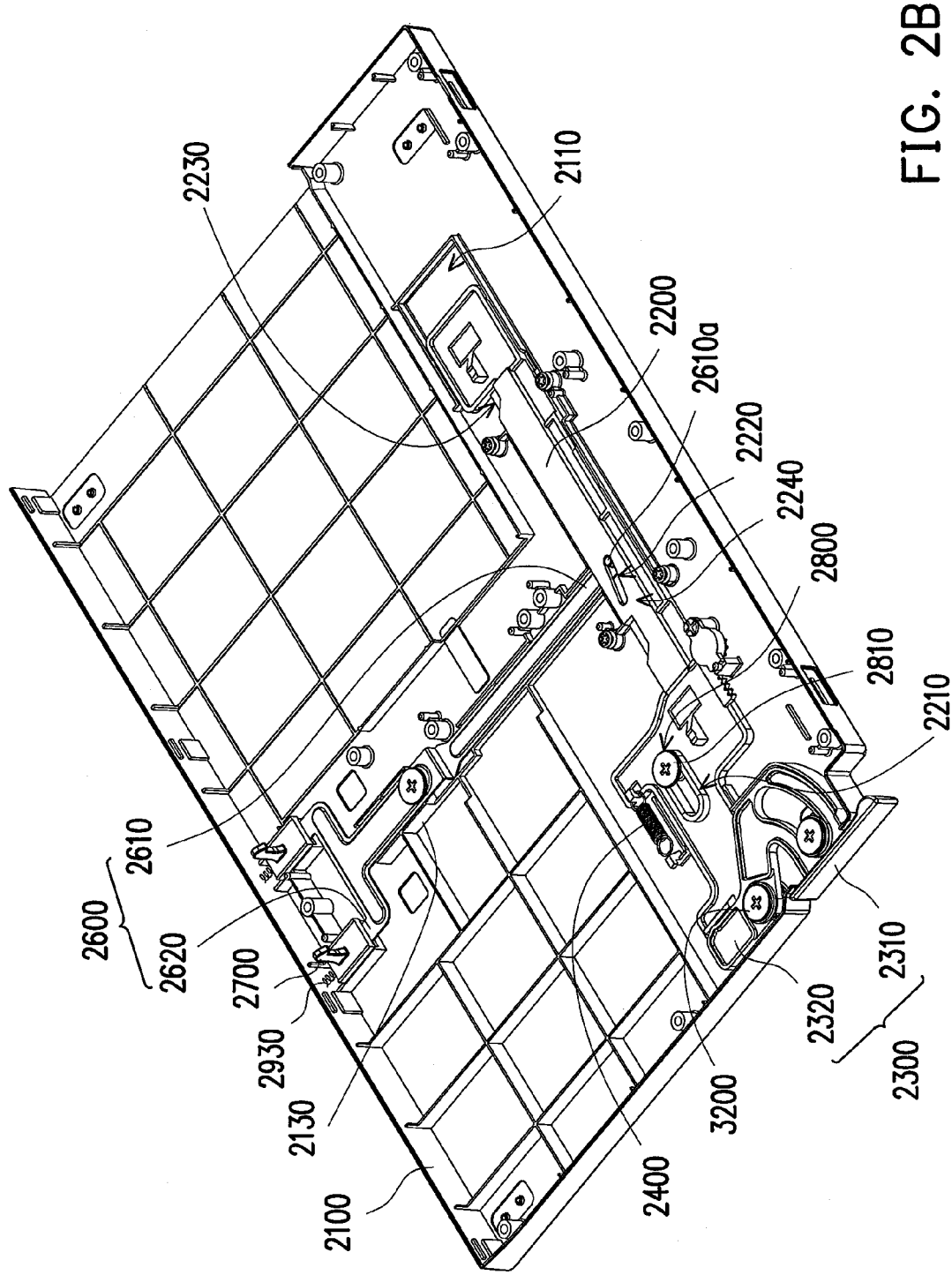
FIG. 2B is a diagram of the docking station of FIG. 2A in a different viewing angle.

FIG. 2A is a diagram of a docking station according to an embodiment of the present invention, FIG. 2B is a diagram of the docking station of FIG. 2A in a different viewing angle and FIG. 3 is a diagram of a portable computer suitable to be connected to the docking station of FIGS. 2A and 2B. Referring to FIGS. 2A, 2B and 3, a docking station 2000 of the embodiment is connected to a portable computer 3000, wherein the bottom surface 3100 of the portable computer 3000 has a plurality of positioning portions 3110 disposed correspondingly to the docking station 2000, the positioning portions 3110 can be grooves and the portable computer 3000 is connected to the docking station 2000 through the positioning portions 3110.

Figure 4:
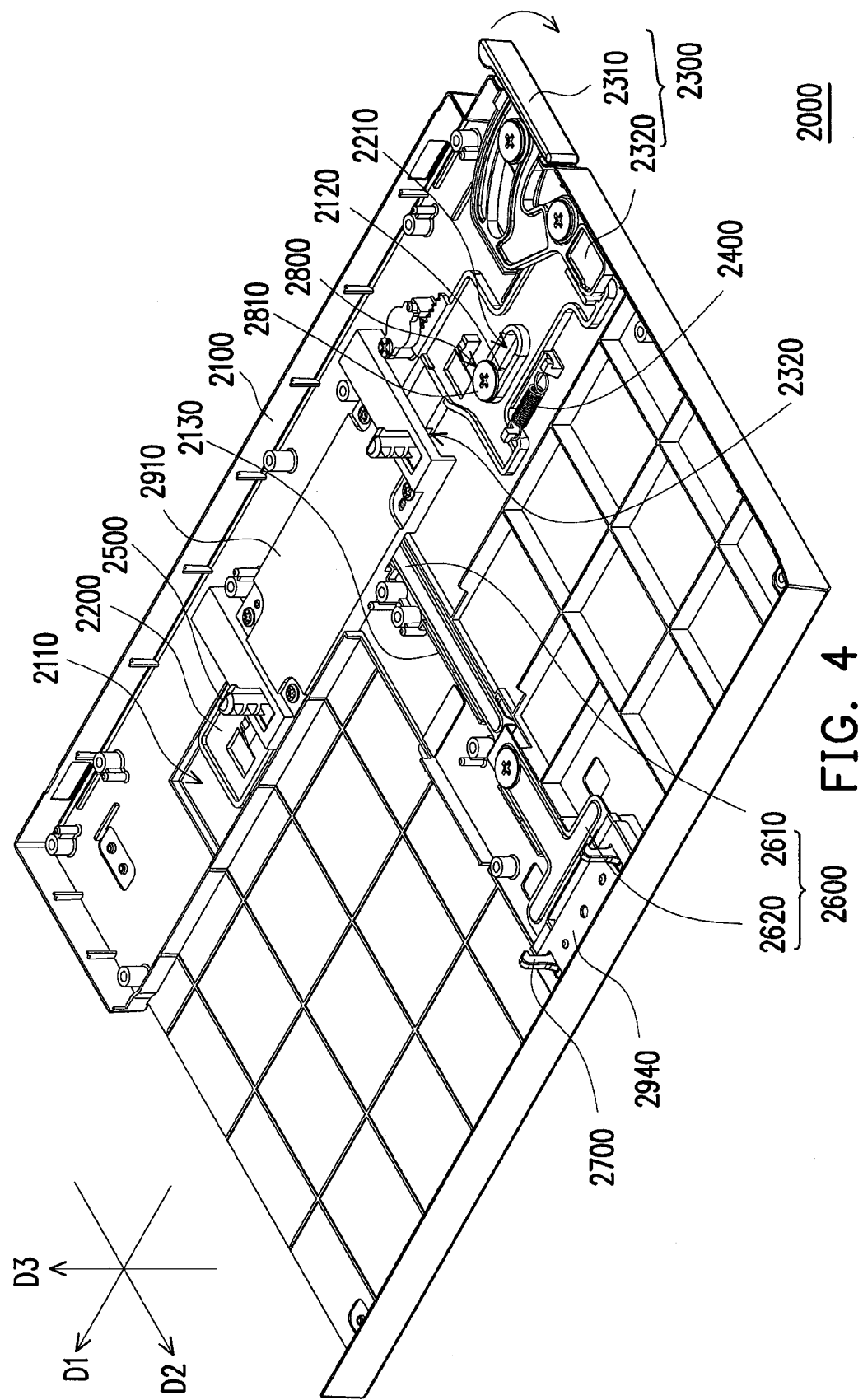
FIG. 4 is a diagram of the docking station of FIG. 2A further including a raising cover.

FIG. 4 is a diagram of the docking station of FIG. 2A further including a raising cover. Referring to FIGS. 2A, 2B and 4, the docking station 2000 includes a housing 2100, a sliding block 2200, a pulling element 2300, a first elastic component 2400, a plurality of first hooks 2500, a linkage 2600 and a plurality of second hooks 2700. The material of the housing 2100 is metal, the housing 2100 has a plurality of constraining structures and the constraining structures can be grooves, raised ribs, raised posts or a combination thereof.

The sliding block 2200 is disposed in a first constraining structure 2110 of the housing 2100 and can be fabricated by injection moulding process, and the material of the sliding block 2200 can be plastic. The sliding block 2200 has a first driven structure 2210, which and a second constraining structure 2210 of the housing 2100 are structurally intervened with each other so that the sliding block 2200 is enforced to reciprocate along the first direction D1. In the embodiment, the first driven structure 2210 is an opening, the second constraining structure 2120 for restricting the moving of the sliding block 2200 is a raised post and the sliding block 2200 is enforced to reciprocate along the first direction D1 and unable to move in the second direction D2 by means of the dimension fit between the opening and the raised post, wherein the first direction D1 and the second direction D2 are perpendicular to each other.

In order to avoid the docking station 2000 from vibration which may results in changing the position of the sliding block 2200 in the first constraining structure 2110 and thereby making the docking station 2000 fail to function, the docking station 2000 further employs a constraining element 2800. The constraining element 2800 has a constraining portion 2810 and a connecting portion (not shown), wherein the connecting portion can be sheathed by and disposed in the second constraining structure 2120 and the diameter of the constraining portion 2810 is greater than the diameter of the first driven structure 2210 in the second direction D2, so that the sliding block 2200 is restricted from moving in the third direction D3, wherein the third direction D3, the first direction D1 and the second direction D2 are perpendicular to each other. In the embodiment, the constraining element 2800 can be a screw and the connecting portion (not shown) can be a bolt, wherein the bolt is locked in the raised post. In other embodiments, the constraining element 2800 can be a T-shaped buckle and the connecting portion of the constraining element 2800 is locked in the raised post.

The above-mentioned second constraining structure 2120 is a raised post and the first driven structure 2210 is an opening, which are examples only and the present invention is not limited to. People skilled in the art are allowed to modify the shapes of the second constraining structure 2120 and the first driven structure 2210 if the second constraining structure 2120 and the first driven structure 2210 can be structurally intervened with each other, which is counted as the spirit of the present invention. For example, the first driven structure 2210 can be a groove and the second constraining structure 2120 can be a raised rib having a shape corresponding to the groove; or, the first driven structure 2210 can be raised post and the second constraining structure 2120 can be groove having a shape corresponding to the raised post.

Continuing to FIGS. 2A, 2B and 4, the pulling element 2300 is pivoted on the housing 2100 through a pivoting element 3200, and the pivoting element 3200 is, for example, a screw. The pivoting element 3200 is a common component, well known by the people skilled in the art and not involved in the technical features of the present invention, therefore, it is omitted to describe. The pulling element 2300 has a pulling portion 2310 and a pushing portion 2320, wherein the pulling portion 2310 is exposed out of the housing 2100 for a user to pull the pulling portion 2310. In addition, the pushing portion 2320 contacts the sliding block 2200, and when the user pulls the pulling portion 2310 by exerting a force, the pulling element 2300 would swing about the pivoting element serving as an axis and the pushing portion 2320 would push the sliding block 2200. Besides, in order to avoid an excessive force by the user to break down the pulling element 2300, the material of the pulling element 2300 should be metal with tougher strength.

The first elastic component 2400 is connected between the housing 2100 and the sliding block 2200, and in the embodiment the first elastic component 2400 is a spring. The first hooks 2500 are disposed on the raising cover 2910 and driven by the sliding block 2200 so as to reciprocate in the second direction D2. The material of the first hooks 2500 in the embodiment can be plastic. In more details, the sliding block 2200 has a second driving structure 2230 and the second driving structure 2230 can be a groove with a slanted surface. The first hooks 2500 are driven by the grooves with slanted surfaces to move slanting towards the second direction D2.

The linkage 2600 is disposed in a third constraining structure 2130 of the housing 2100 and has a first end 2610 and a second end 2620, wherein the first end 2610 is connected to and driven by the sliding block 2200 so as to reciprocate in the second direction D2. In consideration of avoiding friction and damage, the linkage 2600 of the embodiment is made of metal with tougher strength.

The first end 2610 of the linkage 2600 has a second driven structure 2610*a*, the sliding block 2200 has a first driving structure 2220 and the first driving structure 2220 and the second driven structure 2610*a* are structurally intervened with each other so that the linkage 2600 can be driven by the sliding block 2200. In the embodiment, the first driving structure 2220 of the sliding block 2200 is an opening, the first end 2610 of the linkage 2600 can be a raised post and the raised post goes through the opening. By means of the dimension fit between the diameter of the raised post and the diameter of the opening in the second direction D2, when the sliding block 2200 moves towards the first direction D1, the second driven structure 2610*a* is driven by the first driving structure 2220 and the linkage 2600 moves towards the second direction D2. Similarly, anyone skilled in the art can alter the shapes of the second driven structure 2610*a* and the first driving structure 2220, for example, the first driving structure 2220 can be a raised post or a raised rib and the second driven structure 2610*a* can be an opening or a groove.

The second hooks 2700 are disposed in the housing 2100 and link the linkage 2600, so that the second hooks 2700 are driven by the second end 2620 of the linkage 2600 and able to reciprocate in the second direction D2. In addition, the material of the second hooks 2700 can be plastic. It should be noted that the second hooks 2700 are two ones as shown in figures; accordingly, the second end 2620 of the linkage 2600 is designed in Y-shape, which facilitates to make the two second hooks 2700 simultaneously move towards the second direction D2 when the linkage 2600 moves in the second direction D2.

Figure 5:
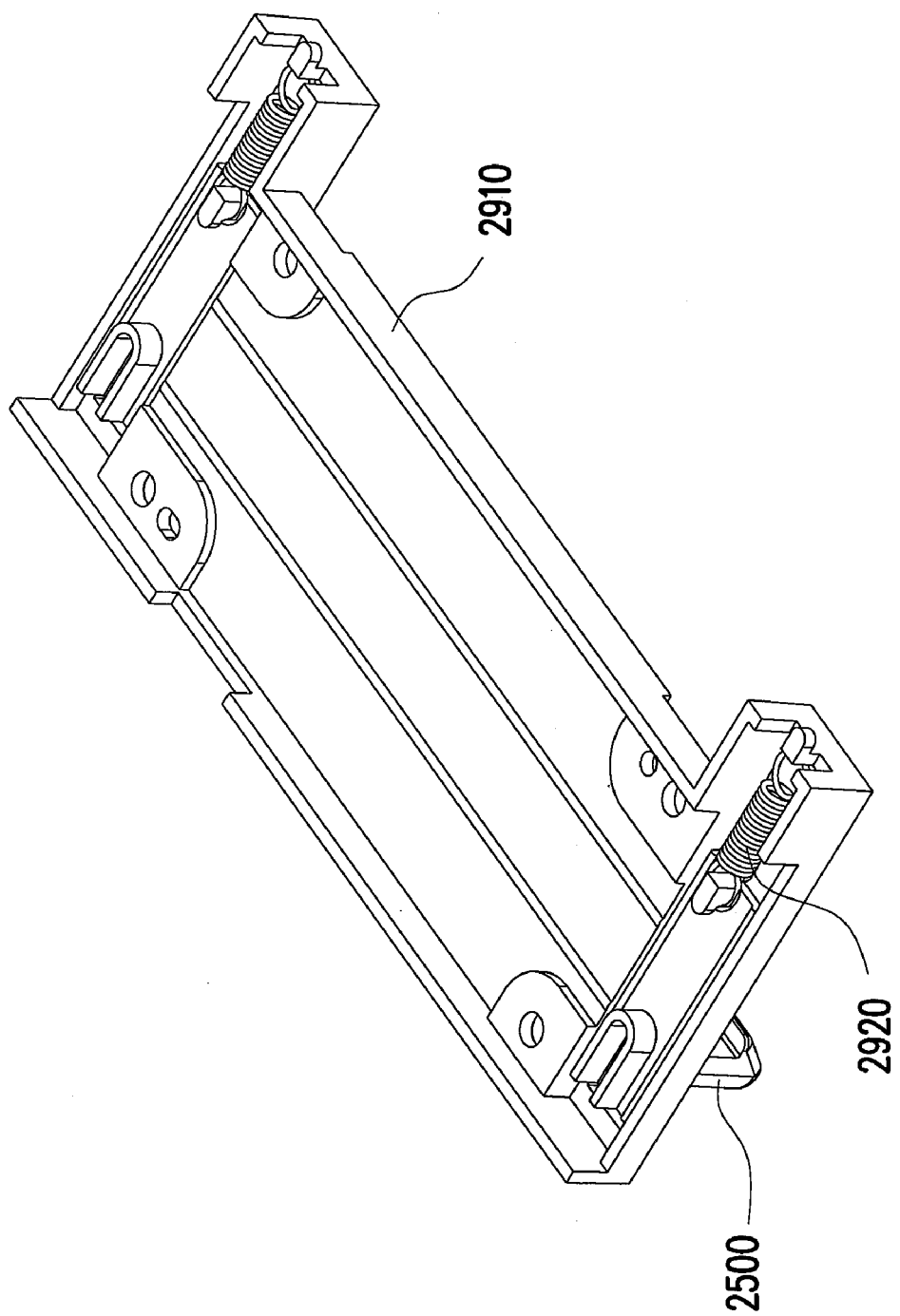
FIG. 5 is an assembly diagram of the raising cover, the first hook and the second elastic element according to the embodiment of the present invention.

FIG. 5 is an assembly diagram of the raising cover, the first hook and the second elastic element according to the embodiment of the present invention. Referring to FIGS. 2A, 4 and 5, the docking station 2000 includes a raising cover 2910 disposed at the housing 2100 and covering a part of the sliding block 2200, and a part of each of the first hooks 2500 go through out of the raising cover 2910. A third driving structure 2240 is disposed at a place of the sliding block 2200 corresponding to the raising cover 2910, so that when the sliding block 2200 moves along the first direction D1, the raising cover 2910 is driven by the third driving structure 2240 to move towards the third direction D3 and thereby the portable computer (as shown by FIG. 3) is upwards extracted. In the embodiment, the third driving structure 2240 is a slanted surface.

The docking station 2000 further includes a plurality of second elastic components 2920 respectively connected between the corresponding first hooks 2500 and the raising cover 2910. The second elastic components 2920 in the embodiment can be springs. The raising cover 2910 can make the driven first hooks 2500 move more smoothly and more stably and the elastic restoring force stored in the second elastic components 2920 enables the first hooks 2500 restoring back to the original position.

In order to enable the second hooks 2700 automatically restoring back to the original position, the docking station 2000 further includes a plurality of third elastic components 2930, which are respectively connected between the corresponding second hooks 2700 and the housing 2100. The third elastic components 2930 of the embodiment can be springs so that the second hooks 2700 can restore back to the original position by means of the elastic restoring forces of the springs.

In order to prevent the second hooks 2700 from falling off from the docking station 2000 in the third direction D3, the docking station 2000 further includes a constraining cover 2940 disposed on the second end 2620 of the linkage 2600, and a part of each of the second hooks 2700 goes through out of the constraining cover 2940. In the embodiment, the material of the constraining cover 2940 can be metal. The constraining cover 2940 can make the second hooks 2700 move in the second direction D2 more smoothly and more stably.

Continuing to FIGS. 3 and 4, when the portable computer 3000 is connected to the docking station 2000, the first hooks 2500 and the second hooks 2700 respectively are locked into the positioning portions 3110 of the bottom surface 3100 of the portable computer 3000, where the positions of the components of the docking station 2000 are shown in FIG. 4.

Figure 6:
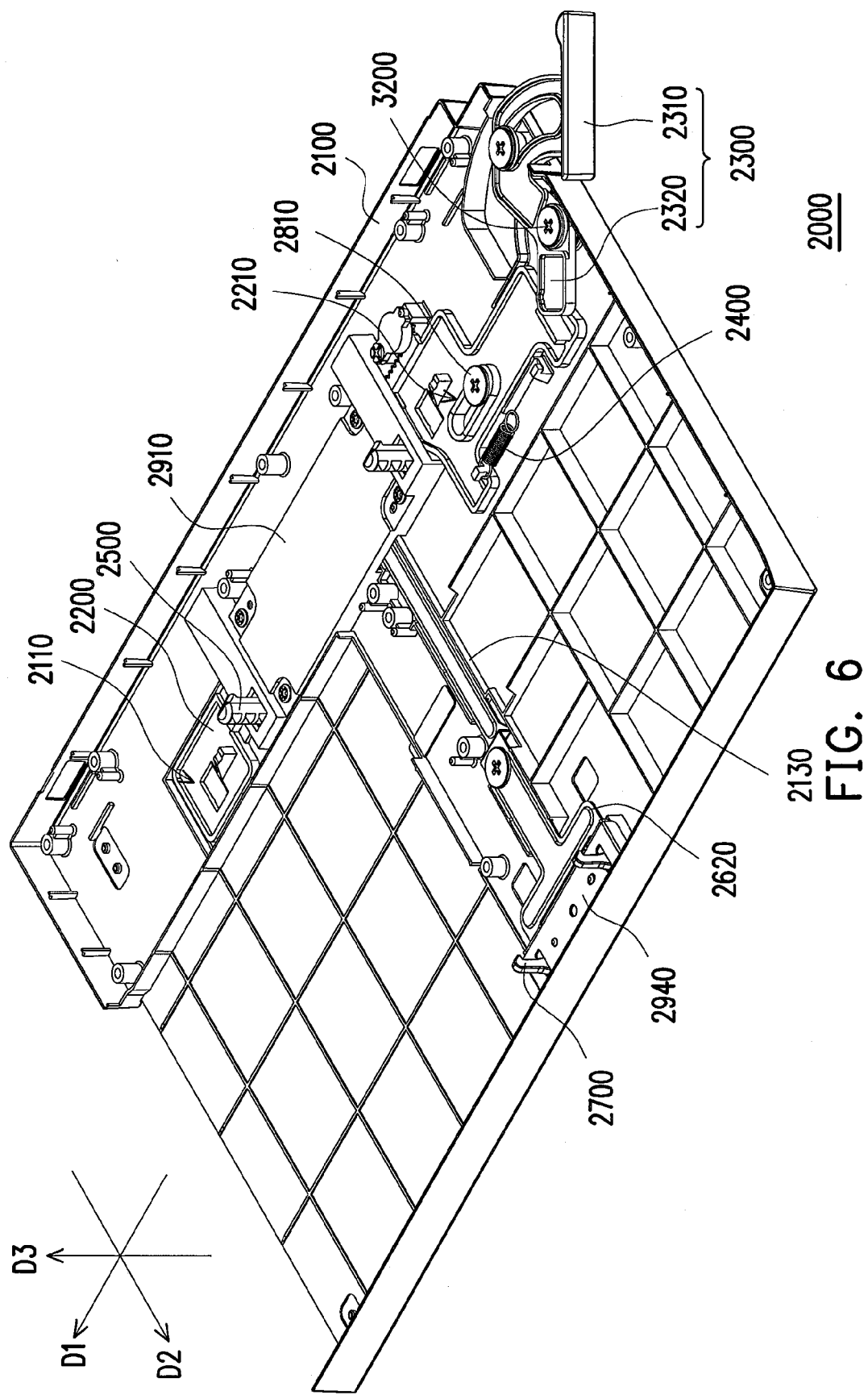
FIG. 6 is a diagram showing how a portable computer is released from constraining position by pulling the pulling element to activate the corresponding components in a docking station.

FIG. 6 is a diagram showing how a portable computer is released from limiting position by pulling the pulling element to activate the corresponding components in a docking station. Referring to FIGS. 2A, 4 and 6, when a user want to detach the portable computer 3000 from the docking station 2000, the user needs to pull the pulling portion 2310 of the pulling element 2300 by exerting a force, so that the pulling element 2300 swings about the pivoting element 3200 serving as the axis, and the pushing portion 2320 pushes the sliding block 2200 to move along the first direction D1.

The sliding block 2200 moves in the first constraining structure 2110, the first driven structure 2210 moves along the second constraining structure 2120, and the moving distance of the sliding block 2200 can be limited by means of the first constraining structure 2110 and the second constraining structure 2120.

When the sliding block 2200 moves along the first direction D1, driven by the second driving structure 2230, the first hooks 2500 slanting move towards the second direction D2 following the profile of the second driving structure 2230. At the time, the first hooks 2500 are unlocked from the positioning portions 3110 of the bottom surface 3100 of the portable computer 3000 (as shown by FIG. 3).

Meanwhile, by means of the intervention between the second driven structure 2610a of the first end 2610 of the linkage 2600 and the first driving structure 2220 of the sliding block 2200, the second driven structure 2610a is driven by the first driving structure 2220 to move towards the second direction D2, the second end 2620 of the linkage 2600 pushes the second hooks 2700 so that the second hooks 2700 move towards the second direction D2 as well. As a result, the second hooks 2700 are unlocked from the positioning portions 3110 of the portable computer 3000 (as shown by FIG. 3).

In addition, the raising cover 2910 is driven by the third driving structure 2240 of the sliding block 2200 to move towards the third direction D3, so that the portable computer 3000 (as shown by FIG. 3) is extracted from the docking station 2000 and the user can then easily take off the portable computer 3000 from the docking station 2000.

Referring to FIGS. 3 and 6, the docking station 2000 can further include a plurality of extracting elements (not shown), which are disposed in the housing 2100 at positions depending on the application requirement. The extracting elements include a plurality of elastic components and a plurality of extracting heads. When the first hooks 2500 and the second hooks 2700 are unlocked from the portable computer 3000, by means of the elastic restoring forces of the elastic components, the extracting heads upwards extract the portable computer 3000 so as to make the user conveniently take off the portable computer 3000. During the extracting elements move towards the third direction D3 to extract the portable computer 3000, in order to prevent the electronic components in the portable computer 3000 from shocking to be damaged, the extracting heads are preferably made of elastic rubber; or the extracting heads are made of a hard material such as metal or plastic, but enclosed by rubber gloves.

Continuing to FIGS. 3, 4 and 5, after the user takes off the portable computer 3000 from the docking station 2000, the user can manually pull the pulling element 2300 again to make the pulling portion 2310 of the pulling element 2300 back to the original position. However, the pulling element 2300 can also automatically back to the original position by means of the elastic restoring force provided by the pivoting element 3200 when the user takes off the portable computer 3000 from the docking station 2000 and leaves the pulling element 2300 alone. At the time, no force on the sliding block 2200 is exerted by the pushing portion 2320 of the pulling element 2300, only the elastic restoring force of the first elastic component 2400 makes the sliding block 2200 back to the original position. In addition, the first hooks 2500 are free from the position-limiting of the second driving structure 2230 of the sliding block 2200 so that the first hooks 2500 restore position by means of the elastic restoring force of the second elastic components 2920. The raising cover 2910 restores position by means of guiding of the third driving structure 2240.

The linkage 2600 is driven by the sliding block 2200 to move back to the original position, wherein the second driven structure 2610a of the linkage 2600 and the first driving structure 2220 of the sliding block 2200 are structurally intervened with each other. At the time, the second hooks 2700 are released from the gravity load of the portable computer 3000 and the third elastic components 2930 (as shown in FIG. 2B) restore the original shapes by means of the elastic restoring forces thereof so as to push the second hooks 2700 back to the original positions.

In summary, the components in the docking station interact smoothly, which enables the hooks easily unlocked from the positioning portions of the portable computer. In this way, the user can conveniently detach the portable computer from the docking station. In this regard, the docking station provided by the present invention benefits users with great utilization convenience.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A docking station, suitable to be connected to a portable computer, comprising:
   a housing, having a first constraining structure and a second constraining structure;
   a sliding block, disposed in the first constraining structure;
   a pulling element, disposed on the housing and having a pulling portion and a pushing portion, wherein the pulling portion is exposed out of the housing and the pushing portion contacts to the sliding block;
   a first elastic element, connected between the housing and the sliding block;
   a plurality of first hooks, disposed on a raising cover and driven by the sliding block, wherein the raising cover is disposed on the housing;
   a linkage, disposed in the second constraining structure of the housing and having a first end and a second end, wherein the first end is connected to and driven by the sliding block; and
   a plurality of second hooks, disposed in the housing and driven by the second end of the linkage,
   wherein when pulling the pulling portion of the pulling element, the pushing portion pushes the sliding block to move in the first constraining structure towards a first direction, the first hooks and the linkage are driven by the sliding block so as to both move towards a second direction, the linkage drives the second hooks to move towards the second direction, and the first direction and the second direction are perpendicular to each other.

2. The docking station according to claim 1, wherein a material of the housing is metal.

3. The docking station according to claim 1, wherein the first constraining structure comprises groove, raised rib, raised post or a combination thereof.

4. The docking station according to claim 1, wherein the sliding block has a first driven structure, and the first driven structure is intervened with a third constraining structure to restrict the moving of the sliding block.

5. The docking station according to claim 4, wherein the first driven structure is an opening or a groove and the second constraining structure is a raised post or a raised rib.

6. The docking station according to claim 5, further comprising a constraining element, wherein the constraining element has a constraining portion and a connecting portion, the connecting portion is sheathed by and disposed in the third constraining structure, the diameter of the constraining portion is greater than the diameter of the first driven structure in the second direction so as to restrict the moving of the sliding block in a third direction, wherein the third direction, the first direction and the second direction are perpendicular to each other.

7. The docking station according to claim 6, wherein the constraining element is a screw.

8. The docking station according to claim 4, wherein the first driven structure is a raised post and the first constraining structure is a groove.

9. The docking station according to claim 1, wherein the sliding block has a first driving structure, the linkage has a second driven structure and the first driving structure is intervened with the second driven structure so as to make the linkage driven by the sliding block.

10. The docking station according to claim 9, wherein the first driving structure is an opening and the second driven structure is a raised post.

11. The docking station according to claim 9, wherein the first driving structure is a raised post and the second driven structure is a groove.

12. The docking station according to claim 1, wherein the sliding block has a second driving structure and the first hooks are suitable to be driven by the second driving structure to move towards the second direction.

13. The docking station according to claim 12, wherein the second driving structure is a groove with slanted surface.

14. The docking station according to claim 1, wherein a material of the sliding block is plastic.

15. The docking station according to claim 1, wherein a material of the pulling element is metal.

16. The docking station according to claim 1, wherein the raising cover covers a part of the sliding block and a part of the first hooks goes through out of the raising cover.

17. The docking station according to claim 16, wherein the sliding block further has a third driving structure disposed correspondingly to the raising cover, wherein the raising cover is suitable to be driven by the third driving structure so as to move towards a third direction perpendicular to the first direction and the second direction.

18. The docking station according to claim 17, wherein the third driving structure is slanted surface.

19. The docking station according to claim 16, wherein a material of the raising cover is plastic or acrylic.

20. The docking station according to claim 16, further comprising a plurality of second elastic components and the second elastic components are connected between the corresponding first hooks and the raising cover.

21. The docking station according to claim 20, wherein the second elastic elements are springs.

22. The docking station according to claim 1, wherein a material of the first hooks is plastic.

23. The docking station according to claim 1, wherein a material of the linkage is metal.

24. The docking station according to claim 1, wherein a material of the second hooks is plastic.

25. The docking station according to claim 1, further comprising a plurality of third elastic elements, wherein the third elastic elements are disposed between the housing and the corresponding second hooks.

26. The docking station according to claim 25, wherein the third elastic elements are springs.

27. The docking station according to claim 1, further comprising a constraining cover disposed at the second end of the linkage, wherein a part of each of the second hooks goes through out of the constraining cover.

28. The docking station according to claim 27, wherein a material of the constraining cover is metal.

* * * * *